US012584786B2

(12) United States Patent
Mutnury et al.

(10) Patent No.: US 12,584,786 B2
(45) Date of Patent: Mar. 24, 2026

(54) DETECTING VIBRATION OF A CABLE OF AN INFORMATION HANDLING SYSTEM

(71) Applicant: Dell Products L.P., Round Rock, TX (US)

(72) Inventors: Bhyrav M. Mutnury, Round Rock, TX (US); Sandor Tibor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/470,081

(22) Filed: Sep. 19, 2023

(65) Prior Publication Data

US 2025/0093199 A1 Mar. 20, 2025

(51) Int. Cl.
G01H 9/00 (2006.01)

(52) U.S. Cl.
CPC .................................... G01H 9/004 (2013.01)

(58) Field of Classification Search
None
See application file for complete search history.

(56) References Cited

U.S. PATENT DOCUMENTS 7,884,583 B2 * 2/2011 Lenz .................. H03K 17/6871
323/224
10,809,149 B2 * 10/2020 Choudhary ........... G01S 13/536

| 2008/0297213 | A1 * | 12/2008 | Abbasfar | .............. | H04L 7/0008 |
| | | | | | 327/156 |
| 2012/0242537 | A1 * | 9/2012 | Kluczewski | ............ | G01S 13/88 |
| | | | | | 342/192 |
| 2013/0139597 | A1 * | 6/2013 | Lin | .......................... | G01H 9/00 |
| | | | | | 73/584 |
| 2014/0038534 | A1 * | 2/2014 | Ciacci | ...................... | H03C 5/00 |
| | | | | | 455/108 |
| 2014/0098481 | A1 * | 4/2014 | Hartman | ............... | F04D 25/166 |
| | | | | | 361/679.31 |
| 2015/0112640 | A1 * | 4/2015 | Niro | ....................... | G01D 15/00 |
| | | | | | 702/183 |
| 2022/0407676 | A1 * | 12/2022 | Zhang | ................... | H04L 7/0054 |

* cited by examiner

*Primary Examiner* — Michelle M Iacoletti
*Assistant Examiner* — Maher Yazback
(74) *Attorney, Agent, or Firm* — McDermott Will & Schulte LLP

(57) ABSTRACT

Detecting vibration of a cable including providing a clock signal along a cable, the clock signal is modulated along the cable by a vibration frequency to generate a modulated signal along the cable that includes upper and lower side-band frequencies with respect a frequency of the clock signal; providing the modulated signal to a multiplexer, a positive polarity signal of the modulated signal is provided to a first input line of the multiplexer and a negative polarity signal of the modulated signal is provided to a second input line of the multiplexer; selecting one of the positive polarity signal and the negative polarity signal based on a state of a reference signal; demodulating, based on the selecting, the modulated signal to generate a demodulated signal, including generating the vibration frequency at a baseband of the demodulated signal; filtering the demodulated signal to obtain filtered signal including only the vibration frequency.

18 Claims, 3 Drawing Sheets

*300*

Provide Clock
Signal
*302*

Provide Modulated
Signal
*304*

Select Signal
*306*

Demodulate
Modulated Signal
*308*

Filter Demodulated
Signal
*310*

DETECTING VIBRATION OF A CABLE OF AN INFORMATION HANDLING SYSTEM

BACKGROUND

Field of the Disclosure

The disclosure relates generally to an information handling system, and in particular, detecting vibration of a cable of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of detecting vibration of a cable of an information handling system, including: providing a clock signal along a cable, wherein the clock signal is modulated along the cable by a vibration frequency to generate a modulated signal along the cable that includes upper and lower sideband frequencies with respect a frequency of the clock signal; providing the modulated signal to a multiplexer, wherein a positive polarity signal of the modulated signal is provided to a first input line of the multiplexer and a negative polarity signal of the modulated signal is provided to a second input line of the multiplexer; selecting one of the positive polarity signal and the negative polarity signal based on a state of a reference signal; demodulating, based on the selecting, the modulated signal to generate a demodulated signal, including generating the vibration frequency at a baseband of the demodulated signal; and filtering the demodulated signal to obtain a filtered signal including only the vibration frequency.

Other embodiments of these aspects include corresponding systems, apparatus, and computer programs, configured to perform the actions of the methods, encoded on computer storage devices.

These and other embodiments may each optionally include one or more of the following features. For instance, a frequency of the reference signal is the same as a frequency of the clock signal. The upper sideband frequency is based on a summation of a frequency of the clock signal and the vibration frequency, and wherein the lower sideband frequency is based on a difference of the frequency of the clock signal and the vibration frequency. The demodulated signal includes the frequency of the clock signal, the upper sideband frequency, the lower sideband frequency, and the vibration frequency. Removing jitter from the reference signal. Sampling and converting the filtered signal to generate a single frequency discrete Fourier transform (DFT). Comparing the single frequency DFT to a threshold; determining, based on the comparing, that the single frequency DFT is greater than the threshold; and in response to determining that the single frequency DFT is greater than the threshold, recording the vibration frequency. In response to determining that the single frequency DFT is greater than the threshold, adjusting a revolutions per minute (RPM) of a fan of the information handling system, wherein the fan is a source of the vibration frequency. In response to determining that the single frequency DFT is greater than the threshold, adjusting a power state of a fan of the information handling system to an off-power state, wherein the fan is a source of the vibration frequency.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
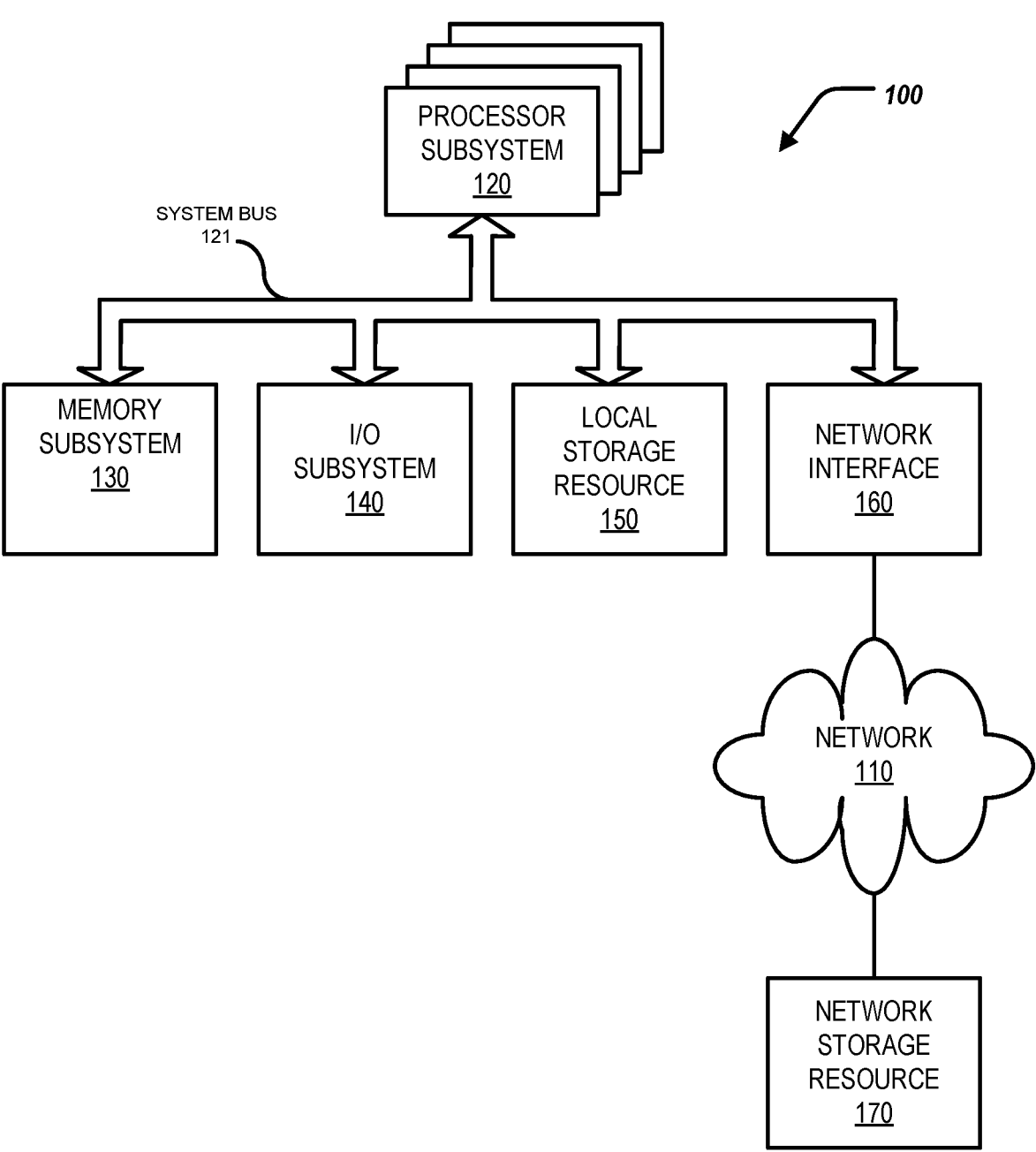
FIG. 1 is a block diagram of selected elements of an embodiment of an information handling system.

This disclosure discusses methods and systems for detecting vibration of a cable of an information handling system. In short, the cable can experience vibrations (e.g., from a fan rotating) that introduces a vibration frequency within a clock signal along the propagation path of the cable. The vibration frequency can be identified, and a revolutions per minute (RPM) of the fan can be adjusted to mitigate the effects of the vibration frequency on the cable, and/or the fan turned to an off-power state.

Specifically, this disclosure discusses a system and a method for detecting vibration of a cable of an information handling system, the method including providing a clock signal along a cable, wherein the clock signal is modulated along the cable by a vibration frequency to generate a modulated signal along the cable that includes upper and lower sideband frequencies with respect a frequency of the clock signal; providing the modulated signal to a multiplexer, wherein a positive polarity signal of the modulated signal is provided to a first input line of the multiplexer and a negative polarity signal of the modulated signal is provided to a second input line of the multiplexer; selecting one of the positive polarity signal and the negative polarity signal based on a state of a reference signal; demodulating, based on the selecting, the modulated signal to generate a demodulated signal, including generating the vibration frequency at a baseband of the demodulated signal; and filtering the demodulated signal to obtain a filtered signal including only the vibration frequency.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
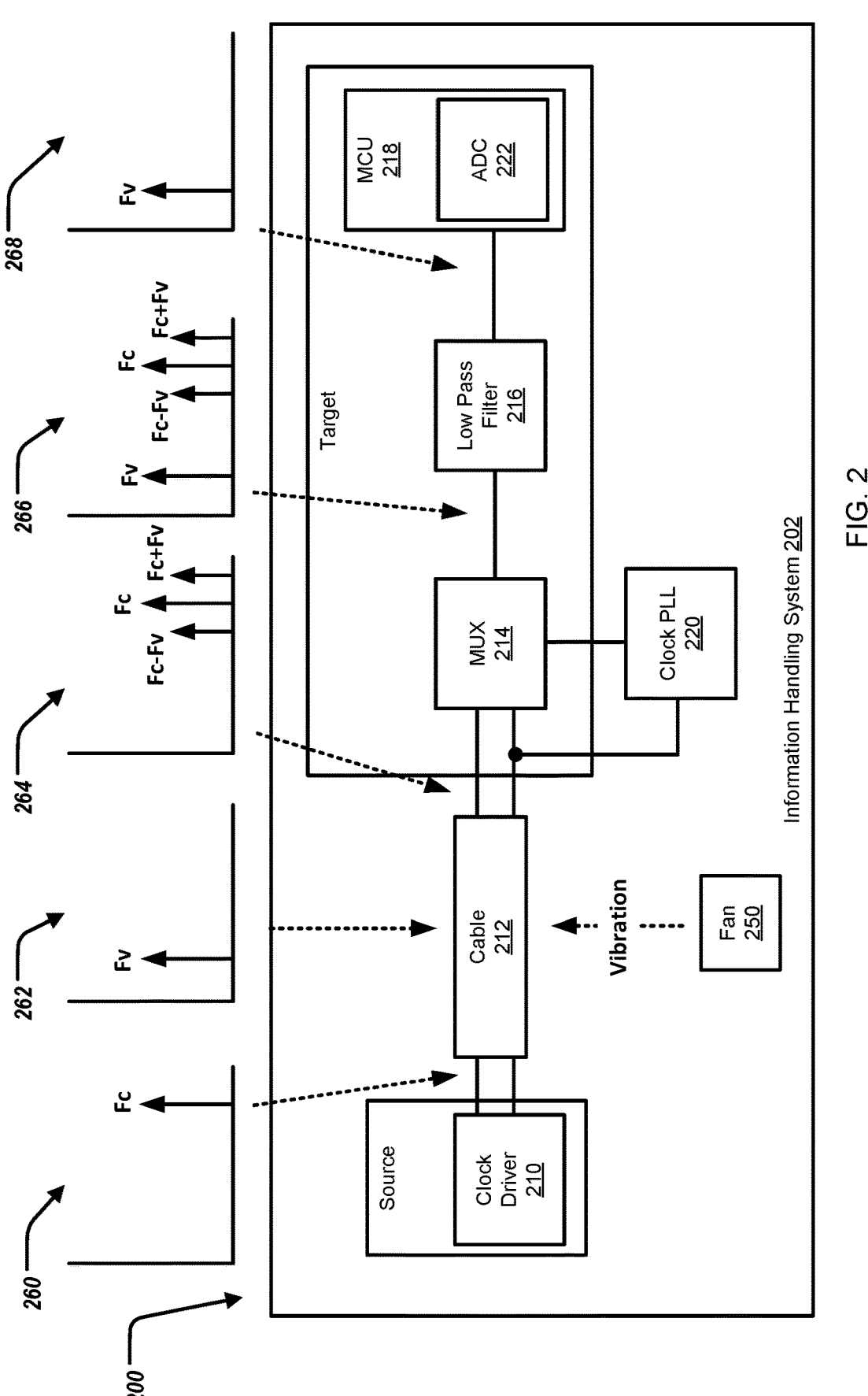
FIG. 2 illustrates a block diagram of an information handling system for detecting vibration of a cable of the information handling system.
Figure 3:
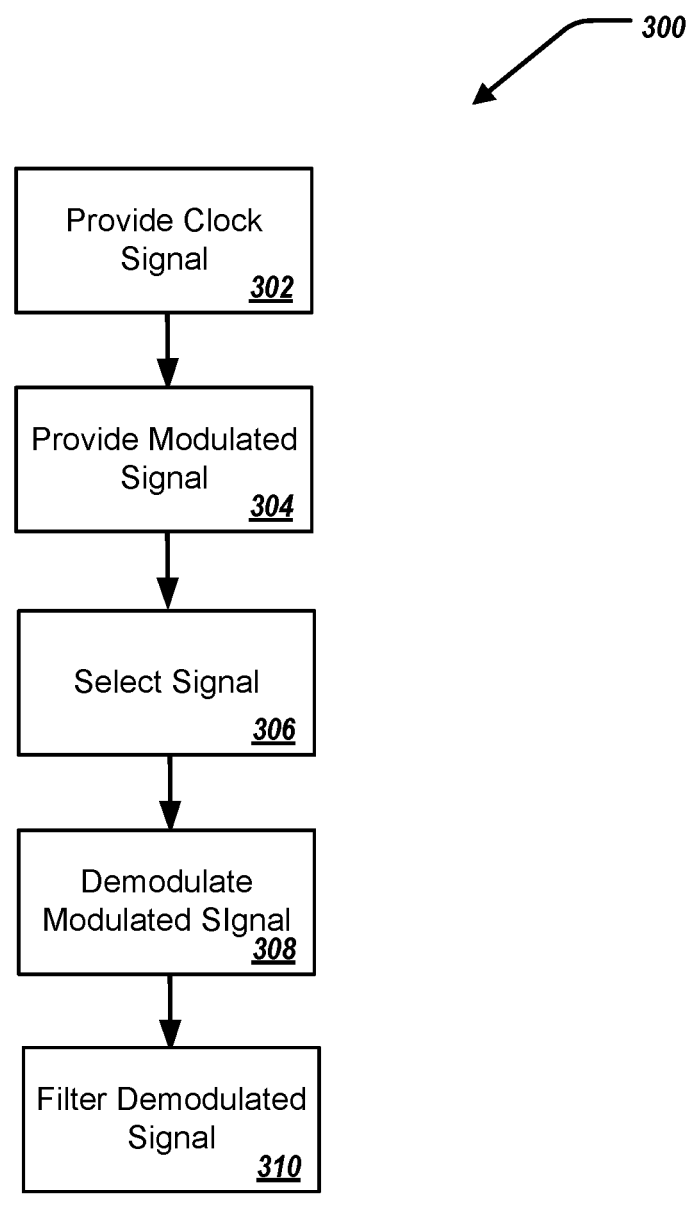
FIG. 3 illustrates a method for detecting vibration of a cable of an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include a clock driver 210, a cable 212, a multiplexer (MUX) 214, a low pass filter 216, a microcontroller unit (MCU) 218, and a clock phase lock loop (PLL) 220. The MCU 218 can include an analog to digital converter (ADC) 222. In some examples, the information handling system 202 is similar to, or includes, the information handling system 100 of FIG. 1.

The clock driver 210 can be in communication with the cable 212, and specifically, the clock driver 210 can be in communication with the MUX 214 over the cable 212. The cable 212 can be in communication with the clock driver 210 and the MUX 214. The MUX 214 can be in communication with the cable 212, the clock driver 210, and the clock PLL 220. The low pass filter 216 can be in communication with the MUX 214 and the MCU 218. The MCU 218 can be in communication with the low pass filter 216.

The cable 212 can be a high-speed cable. For example, the cable 212 can be a twinaxial ("twinax") cable. In some examples, the cable 212 is sensitive to vibrations.

The clock driver 210 is configured to provide a clock signal along the cable 212 (a source of the signal), shown by clock signal Fc on graph 260. In some examples, the clock signal is a square wave. In some examples, the clock signal is approximately 100 MHz. As the clock signal is provided along the cable 212 (propagating down the cable 212), the cable 212 can be exposed, or subjected to, noise and/or vibration. For example, a fan 250 can generate vibrations that the cable 212 is exposed to (e.g., the fan running at 15,000 or greater RPM). That is, the fan 250 is the source of the vibrations of the cable 212. In some examples, the vibrations the cable 212 is exposed to can result in bending, twisting, flexing, or other types of movement of the cable 212.

As a result of the cable 212 being exposed to the vibrations, the clock signal propagating along the cable 212 is modulated by the vibrations. Specifically, the clock signal is modulated along the cable 212 by a vibration frequency, shown by vibration frequency Fv on graph 262. In some examples, the vibration frequency is approximately 1 kHz. In some examples, the vibration frequency is less than 1 kHz.

In short, the cable 212 experiences vibrations (e.g., from the fan 250 rotating) that introduces the vibration frequency within the clock signal along the propagation path of the cable 212. The vibration frequency can be identified, and the RPM of the fan 250 can be adjusted to mitigate the effects of the vibration frequency on the cable 212, and/or the fan 250 can be turned to an off-power state.

The clock signal is modulated along the cable 212 by the vibration frequency to generate a modulated signal along the cable 212. The modulated signal can include an upper sideband frequency and a lower sideband frequency with respect to the frequency of the clock signal. Specifically, the modulated signal will include the upper sideband frequency based on a summation of the frequency of the clock signal and the vibration frequency, shown by Fc+Fv on graph 264; and the modulated signal will include the lower sideband frequency based on a difference of the frequency of the clock signal and the vibration frequency, shown by Fc−Fv on graph 264. The upper sideband frequency and the lower sideband frequency are centered about the clock frequency. The clock signal can be modulated including both amplitude modulation and phase modulation.

The multiplexer (or MUX) 214 is configured to receive the modulated signal. In some examples, the MUX 214 is a 2:1 analog multiplexer. The MUX 214 can receive a positive polarity signal of the modulated signal at a first input line of the MUX 214 (positive polarity signal from differential pair of signals of the modulated signal); and receive a negative polarity signal of the modulated signal at a second input line of the MUX 214 (negative polarity signal from differential pair of signals of the modulated signal).

The MUX 214 is further configured to select one of the positive polarity signal and the negative polarity signal based on a state of a reference signal. Specifically, the MUX 214 receives the reference signal from the clock PLL 220. The clock PLL 220 removes jitter from the clock signal (either the positive polarity signal or the negative polarity signal), and provides this as the reference signal to the MUX 214 for selection regarding the positive polarity signal and the negative polarity signal. In some examples, a frequency of the reference signal is the same as the frequency of the clock signal.

In some examples, when the dominate mode of modulation is amplitude modulation, the MUX 214 receives the reference signal directly from one of the positive polarity signals or the negative polarity signals (bypassing the clock PLL 220).

In some examples, when the reference signal from the clock PLL 220 is "high" (the clock signal is "high") the MUX 214 selects and passes through the negative polarity signal. In some examples, when the reference signal from the clock PLL 220 is "high" (the clock signal is "high") the MUX 214 selects and passes through the positive polarity signal. In some examples, when the reference signal from the clock PLL 220 is "low" (the clock signal is "low") the MUX 214 selects and passes through the positive polarity signal. In some examples, when the reference signal from the clock PLL 220 is "low" (the clock signal is "low") the MUX 214 selects and passes through the negative polarity signal.

The MUX 214 is further configured to, based on selecting one of the positive polarity signal and the negative polarity signal, demodulates the modulated signal to generate a demodulated signal. Specifically, the MUX 214 generates the demodulated signal including the vibration frequency Fv at a baseband of the demodulated signal, shown in graph 266. In other words, the modulated signal is mixed (multiplied) by the reference signal (that has equal frequency to the clock signal). To that end, as the clock signal is a square wave, the multiplication is simplified to polarity inversion of the modulated signal based on the logic state of the clock signal.

The demodulated signal includes the clock frequency, the upper sideband frequency, the lower sideband frequency, and the vibration frequency, as shown by 266.

The MUX passes the demodulated signal to the low pass filter 216. The low pass filter 216 receives the demodulated signal. The low pass filter 216 is configured to filter the demodulated signal to obtain a filtered signal. That is, the low pass filter 216 filters the demodulated signal to obtain the filtered signal including only the vibration frequency, shown by 268. That is, the low pass filter removes (filters out) the upper sideband frequency, the lower sideband frequency, and the clock frequency from the demodulated signal, leaving only the vibration frequency within the filtered signal. That is, as the vibration frequency is much less than the clock frequency, the upper sideband frequency, and the lower sideband frequency, the filtered signal includes only the vibration frequency.

The low pass filter 216 can provide the filtered signal to the MCU 218 through the ADC 222. The MCU 218 can sample and convert the filtered signal to generate a single frequency Fourier transform (DFT) signal. The MCU 218 can compare the single frequency DFT to a threshold. In some examples, the MCU 218, based on the comparing, determines that the single frequency DFT is greater than the threshold. The MCU 218, in response to determining that the single frequency DFT is greater than the threshold, records the vibration frequency. That is, the MCU 218 stores, at a database or memory, data indicating the vibration frequency. In some examples, the MCU 218 can adjust the sample rate of the filtered signal to step through a bandwidth of interest (e.g., 0-1 kHz) incrementally until the bandwidth of interest is characterized. In some examples, the MCU 218 can calculate a fast Fourier transform (FFT) of the bandwidth of interest in a single step.

In some examples, the MCU 218, in response to determining that the single frequency DFT is greater than the threshold, provide instructions/signal to the fan 250 to adjust a revolutions per minute (RPM) of the fan 250. For example, the RPM of the fan 250 can be adjusted to reduce, minimize, and/or prevent generation of the vibration frequency and/or introducing the vibration frequency to the cable 212 and/or bending, twisting, flexing, or other types of movements of the cable 212.

In some examples, the MCU 218, in response to determining that the single frequency DFT is greater than the threshold, provide instructions/signal to the fan 250 to adjust a power state of the fan 250 to an off-power state. For example, the power state of the fan 250 can be adjusted to the off-power state to reduce, minimize, and/or prevent generation of the vibration frequency and/or introducing the vibration frequency to the cable 212 and/or bending, twisting, flexing, or other types of movements of the cable 212.

FIG. 3 illustrates a flowchart depicting selected elements of an embodiment of a method 300 for detecting vibration of a cable of an information handling system. The method 300 may be performed by the information handling system 100, the information handling system 202, the clock driver 210, the MUX 214, the low pass filter 216, and/or the MCU 218, and with reference to FIGS. 1-2. It is noted that certain operations described in method 300 may be optional or may be rearranged in different embodiments.

The clock driver 210 provides the clock signal along the cable 212, at 302. In some examples, the clock signal is modulated along the cable 212 by the vibration frequency to generate the modulated signal along the cable 212 that includes upper and lower sideband frequencies with respect the frequency of the clock signal. The cable 212 provides the modulated signal to the MUX 214, at 304. In some examples, a positive polarity signal of the modulated signal is provided to a first input line of the MUX 214 and a negative polarity signal of the modulated signal is provided to a second input line of the MUX 214. The MUX 214 selects one of the positive polarity signal and the negative polarity signal based on a state of the reference signal, at 306. The MUX 214 demodulates, based on the selecting, the modulated signal to generate a demodulated signal, at 308. In some examples, the MUX 214 generates the demodulated signal including generating the vibration frequency at a baseband of the demodulated signal. The low pass filter 218 filters the demodulated signal to obtain a filtered signal including only the vibration frequency, at 310.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of detecting vibration of a cable of an information handling system, the method including:

providing a clock signal along a cable, wherein the clock signal is modulated along the cable by a vibration frequency to generate a modulated signal along the cable that includes upper and lower sideband frequencies with respect a frequency of the clock signal;

providing the modulated signal to a multiplexer, wherein a positive polarity signal of the modulated signal is provided to a first input line of the multiplexer and a negative polarity signal of the modulated signal is provided to a second input line of the multiplexer;

selecting one of the positive polarity signal and the negative polarity signal based on a state of a reference signal, including:

when it is determined that the state of the reference signal is high, selecting only the negative polarity signal;

when it is determined that the state of the reference signal is low, selecting only the positive polarity signal, wherein the low reference signal is less than the high reference signal;

demodulating, based on the selecting, the modulated signal to generate a demodulated signal, including generating the vibration frequency at a baseband of the demodulated signal; and filtering the demodulated signal to obtain a filtered signal including only the vibration frequency.

2. The method of claim 1, wherein a frequency of the reference signal is the same as a frequency of the clock signal.

3. The method of claim 1, wherein the upper sideband frequency is based on a summation of a frequency of the clock signal and the vibration frequency, and wherein the lower sideband frequency is based on a difference of the frequency of the clock signal and the vibration frequency.

4. The method of claim 3, wherein the demodulated signal includes the frequency of the clock signal, the upper sideband frequency, the lower sideband frequency, and the vibration frequency.

5. The method of claim 1, further including removing jitter from the reference signal.

6. The method of claim 1, further including sampling and converting the filtered signal to generate a single frequency discrete Fourier transform (DFT).

7. The method of claim 6, further including:

comparing the single frequency DFT to a threshold;

determining, based on the comparing, that the single frequency DFT is greater than the threshold; and in response to determining that the single frequency DFT is greater than the threshold, recording the vibration frequency.

8. The method of claim 7, further including:

in response to determining that the single frequency DFT is greater than the threshold, adjusting a revolutions per minute (RPM) of a fan of the information handling system, wherein the fan is a source of the vibration frequency.

9. The method of claim 7, further including:

in response to determining that the single frequency DFT is greater than the threshold, adjusting a power state of a fan of the information handling system to an off-power state, wherein the fan is a source of the vibration frequency.

10. An information handling system, including:

a cable;

a clock driver configured to provide a clock signal along the cable, wherein the clock signal is modulated along the cable by a vibration frequency to generate a modulated signal along the cable that includes upper and lower sideband frequencies with respect a frequency of the clock signal;

a multiplexer configured to:

receive the modulated signal, including receiving a positive polarity signal of the modulated signal at a first input line of the multiplexer and a negative polarity signal of the modulated signal at a second input line of the multiplexer, select one of the positive polarity signal and the negative polarity signal based on a state of a reference signal, including:

when it is determined that the state of the reference signal is high, selecting only the negative polarity signal;

when it is determined that the state of the reference signal is low, selecting only the positive polarity signal, wherein the low reference signal is less than the high reference signal;

demodulate, based in the selecting, the modulated signal to generate a demodulated signal, including generating the vibration frequency at a baseband of the demodulated signal;

a low pass filter configured to filter the demodulated signal to obtain a filtered signal including only the vibration frequency.

11. The information handling system of claim 10, wherein a frequency of the reference signal is the same as a frequency of the clock signal.

12. The information handling system of claim 10, wherein the upper sideband frequency is based on a summation of a frequency of the clock signal and the vibration frequency, and wherein the lower sideband frequency is based on a difference of the frequency of the clock signal and the vibration frequency.

13. The information handling system of claim 12, wherein the demodulated signal includes the frequency of the clock signal, the upper sideband frequency, the lower sideband frequency, and the vibration frequency.

14. The information handling system of claim 10, further including:

a clock phase lock loop (PLL) configured to remove jitter from the reference signal.

15. The information handling system of claim 10, further including:

a microcontroller unit (MCU) configured to sample and convert the filtered signal to generate a single frequency discrete Fourier transform (DFT).

16. The information handling system of claim 15, wherein the MCU is further configured to:

compare the single frequency DFT to a threshold;

determine, based on the comparing, that the single frequency DFT is greater than the threshold; and in response to determining that the single frequency DFT is greater than the threshold, record the vibration frequency.

17. The information handling system of claim 16, wherein the MCU is further configured to:

in response to determining that the single frequency DFT is greater than the threshold, adjust a revolutions per minute (RPM) of a fan of the information handling system, wherein the fan is a source of the vibration frequency.

18. The information handling system of claim 16, wherein the MCU is further configured to:

in response to determining that the single frequency DFT is greater than the threshold, adjust a power state of a fan of the information handling system to an off-power state, wherein the fan is a source of the vibration frequency.

\*   \*   \*   \*   \*